Dec. 1, 1959 C. E. BARTHEL 2,914,886
SOUNDING ATTACHMENT
Filed Feb. 27, 1957
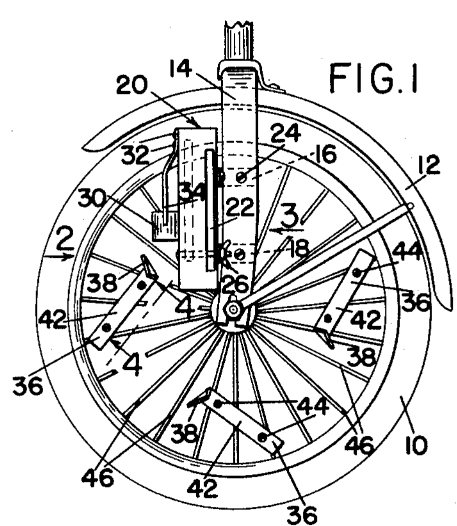
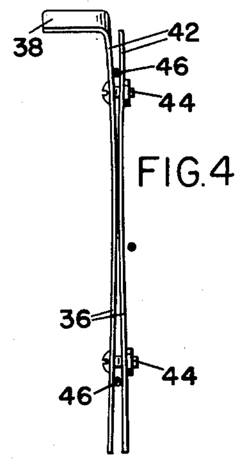
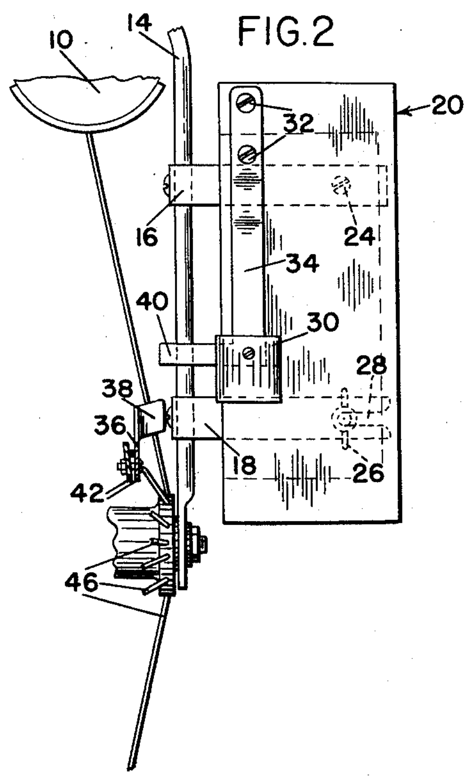
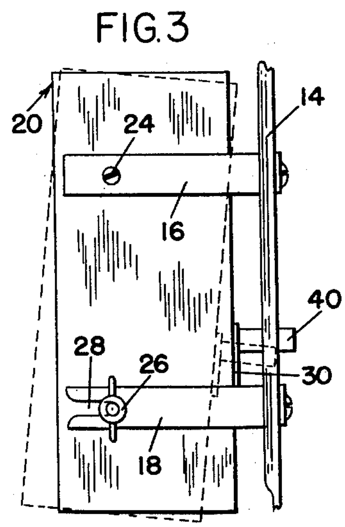
*INVENTOR.*
CHARLES E. BARTHEL
BY Charles R. Fay
Atty.

United States Patent Office 2,914,886

Patented Dec. 1, 1959

2,914,886

SOUNDING ATTACHMENT

Charles E. Barthel, Westminster, Mass.

Application February 27, 1957, Serial No. 642,719

4 Claims. (Cl. 46—175)

This invention relates to new and useful improvements for creating sound effects particularly in wheeled vehicles such as bicycles, velocipedes, etc., and the principal object of the present invention resides in the provision of a sounding attachment which may be applied to the vehicle adjacent any wheel thereof, said sounding attachment including a device such as a clapper which is adapted to be intermittently moved out of its normal position and released so that under spring tension it snaps back to make a percussion sound on a sound-box or the like, in combination with actuator means spaced about the wheel itself to operate the device to create intermittent percussion sounds which imitate the trotting or cantering of a horse whereby the vehicle merely by being propelled produces sounds imitative of the sound of a horse's hooves.

A further object of the invention resides in the provision of a device as above described including means whereby the wheel mounted actuators may be adjusted circumferentially in such a way as to produce the sounds in an irregular pattern for each rotation of the wheel so that the cantering or trotting sounds are easily discernable, or on the contrary the sound actuators may be disposed in more regular pattern to imitate other noises such as the sound of rifle or pistol fire, all to the end that the vehicle may carry out the general effect of a cowboy's horse or the like to a greater and more realistic degree, etc.

Another object of the invention includes the provision of means whereby the sound attachment may be quickly and easily moved to a position wherein the sounds are not produced in the event that the sounds are not desired at any particular time.

Other objects and advantages of the invention will appear hereinafter.

Reference is to be had to the accompanying drawings, in which:

Fig. 1 is a view in elevation of a wheel illustrating the sounding attachment mounted thereon;

Fig. 2 is an enlarged view in elevation, partly in section, illustrating the attachment and looking in the direction of arrow 2 in Fig. 1;

Fig. 3 is a view similar to Fig. 2 but looking in the direction of arrow 3 in Fig. 1; and Fig. 4 is an enlarged section on line 4—4 of Fig. 1.

In carrying out the present invention, the reference numeral 10 indicates the wheel of a vehicle such as either the front or rear wheel of a bicycle or the front wheel of a velocipede or either of the rear wheels thereof, etc. The reference numeral 12 indicates a fender which may or may not be present, and the numeral 14 indicates a yoke or other wheel support commonly found on the vehicle. In the present case, this is illustrated as the front fork of a bicycle but it is to be understood that it may be any other means for supporting the hub of the wheel whether front or rear.

The member 14 is provided with a pair of supporting straps 16 and 18 which may be conveniently mounted on the member 14 by any desired means such as screws or the like. Each strap 16 and 18 is provided with a flange extending out at right angles thereto and at right angles to the axis of the wheel and to these flanges there is connected a sound-box generally indicated at 20. This sound-box may be of any desired or convenient construction and as shown, it is provided with a slot or opening 22 to enhance the sound thereof.

In general, the sound-box 20 extends at right angles to the member 14 and to the axis of the wheel also, and preferably it is swingably mounted on the flange of member 16 by means of a pin or the like 24. Member 18 supports the sound-box adjustably by means of a thumb-nut 26 in a slot 28 in the strap 18 so that the sound-box may be moved from solid line position of Fig. 3 to the dotted line position thereof and as will be brought out hereinafter this provides for deleting the sound effect completely or selectively placing the device in position to provide the sound.

A spring-biased clapper member 30 is mounted as at 32 on a spring 34 and it will be seen that the clapper may be moved for instance to the left in Fig. 1 and when released will be snapped under influence of spring 34 to strike the sound-box a sharp blow resulting in a percussion sound, the quality and degree thereof depending upon the construction, size, and other qualities of sound-box 20.

At spaced intervals on the wheel 10, there are provided a series of clapper actuators 36 each of which is provided with a flange 38 which strikes an arm 40 mounted on the clapper 30, this arm 40 extending in a direction toward the wheel as clearly seen in Figs. 2 and 3 to a position wherein it may be engaged by the flanges 38 of the sound actuators 36 as they revolve about the hub of the wheel as an axis.

Each actuator is conveniently made of a pair of strips of material 42 bolted together as at 44 and including between them a pair of the spokes 46 of the wheel 10. By this means, the actuators are easily and quickly movable from one position to another as desired. As shown in Fig. 1, they are spaced in such a way that two of the actuators are relatively close together and another one is spaced from its nearest actuator a distance greater than the spacing of the first pair. The space between the outermost ones of the three actuators in series is considerably greater, so that as the wheel rotates the clapper will be actuated thereby in such a timing as to imitate the sound of the hooves of a horse as it canters, or any other arrangement or spacing of the actuators 36 is easily made so that any other timing of the sound is easily accomplished according to the wishes of the user.

It will be seen that when the sound-box 20 is moved from the solid line to the dotted line position of Fig. 3, the actuator 40 is out of the path of the flanges 38 of the actuators 36 and therefore no noise will be produced but at the same time the sound-box is held in fixed position and will not rattle or become disengaged from the device.

Having thus described my invention and the advantages thereof, I do not wish to be limited to the details herein disclosed, otherwise than as set forth in the claims, but what I claim is:

1. The combination of a sound-producing device and a wheel, comprising a support, a sound box mounted on the support in close proximity to the wheel, a spring-pressed clapper on the sound-box, a series of separate clapper actuators on the wheel in position to actuate the clapper seriatim as the wheel rotates on the support, and means to detachably mount the several actuators on the wheel.

2. The combination of a sound-producing device and a wheel, comprising a support, a sound-box mounted on the support in close proximity to the wheel, a spring-pressed clapper on the sound-box, and a series of clapper actuators on the wheel in position to actuate the clapper seriatim as the wheel rotates on the support, said actuators being relatively and individually circumferentially adjustable on the wheel to vary the relative circumferential spacing thereof.

3. The combination of a sound producing device and a spoked wheel, comprising a support, a sound box on the support generally parallel to the plane of the wheel and in closely spaced relation thereto, a free-ended leaf spring on the box, a clapper on the spring at the free end thereof, a member on the clapper extending toward the wheel, a plurality of actuating devices on the wheel for striking the clapper member to move the clapper from the box and release the same periodically, each said device comprising a member attached to spokes of the wheel and including a striker portion, the clapper member being in the path thereof, and means detachably securing the devices to the spokes for individual circumferential adjustment of the devices.

4. The combination of a sound producing device and a spoked wheel, comprising a support, a sound box on the support generally parallel to the plane of the wheel and in closely spaced relation thereto, a free-ended leaf spring on the box, a clapper on the spring at the free end thereof, a member on the clapper extending toward the wheel, an actuating device on the wheel for striking the clapper member to move the clapper from the box and release the same periodically, said device comprising a member attached to spokes of the wheel and including a striker portion, the clapper member being in the path thereof, and means detachably securing the device to the spokes.

References Cited in the file of this patent

UNITED STATES PATENTS

| | | |
|---|---|---|
| 1,288,382 | Cercone | Dec. 17, 1918 |
| 2,578,682 | Fernstrom | Dec. 18, 1951 |
| 2,609,640 | Newell et al. | Sept. 9, 1952 |